PRIOR ART FIG. 1
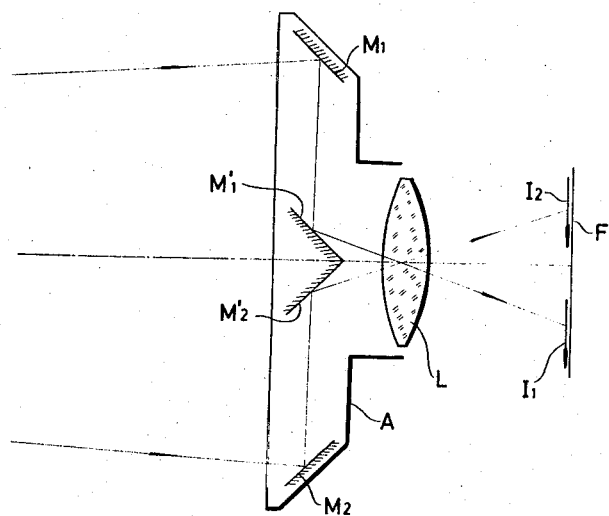
FIG. 2
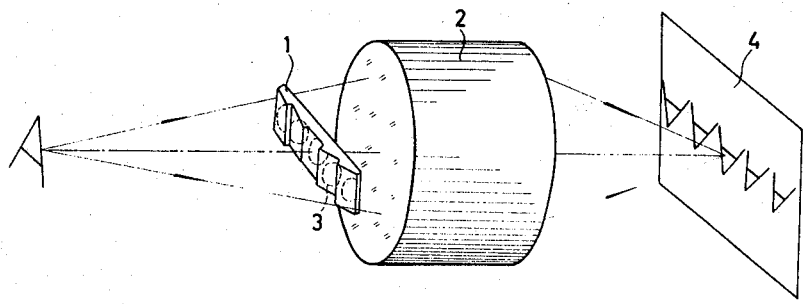

United States Patent Office

3,674,339
Patented July 4, 1972

3,674,339
STEREOSCOPIC PHOTOGRAPH SYSTEM USING A STEREOSCOPIC ATTACHMENT TO A CAMERA
Kazuo Sayanagi, Kanagawa, Japan, assignor to Canon Kabushiki Kaisha, Tokyo, Japan
Filed Sept. 16, 1970, Ser. No. 72,640
Int. Cl. G02b 27/22, 5/04; G03b 35/08
U.S. Cl. 350—130                                    23 Claims

ABSTRACT OF THE DISCLOSURE

In the disclosed system for taking stereoscopic photographs, a plurality of prisms are formed from a single sheet and arranged within the field of a single objective on a camera. Each prism makes a separate image on a different portion of the film. The prisms are arranged to distribute the images throughout the film.

BACKGROUND OF THE INVENTION

This invention relates to photographic apparatuses, and particularly to photographic apparatuses for simultaneously producing stereoscopic or stereoscopic images of an object to be photographed.

In the past such images were produced by burdening cameras with two objective lenses or with complex mirror arrangements. These added substantial bulk, cost and weight to the cameras thus rendering them inconvenient and inefficient.

Also such systems formed only two images and thus produced views which corresponded to the sets of a stage. One flat set appeared to be behind the other.

An object of this invention is to overcome the disadvantages of former devices.

BRIEF DESCRIPTION OF THE DRAWINGS

FIG. 1 is a side view of a hitherto known arrangement for taking stereoscopic photographs using a conventional stereo-attachment.

FIG. 2 is a perspective view of an arrangement for taking stereoscopic pictures using an improved stereo-attachment embodying features of the invention.

DETAILED DESCRIPTION OF PREFERRED EMBODIMENTS

Figure 3:
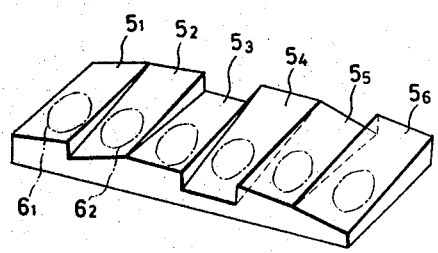
FIG. 3 is a perspective view of a stereo-attachment embodying features of the present invention.

It is known that taking a stereoscopic photograph with a conventional camera requires an attachment (A) and an attachment to be disposed in front of the objective lens accommodated within a conventional type of the camera: A known attachment of this type comprises two pair of mirrors, the one pair of which contains two mirrors (M1), (M'1) and the other pair contains another two mirrors (M2), (M'2) positioning side by side at the right and left as shown in FIG. 1. Bundles of ray from different visual angles in the right and left directions are adapted to fall upon the one objective lens, thereby forming two separate images (I1), (I2) respectively through the one lens to be printed on the surface F of a film. When the positive film for these images is printed based on the negative film obtained as mentioned above, the positive photographic images appear to be a stereoscopic photograph when they are viewed by the right and left eyes. However, in this case, the observer will appear to see the above-mentioned stereoscopic images as something like the scenery on the stage setting which flat images arranged far and near to each other. This gives the picture an abnormal appearance compared to the natural stereoscopic view. The foregoing drawbacks are eliminated in the system for taking stereoscopic photographs as shown in FIG. 2. Here an attachment 1 composed of a plurality of adjacent prisms each having an angle of inclination gradually different from the other and arrayed laterally is arranged in front of an object lens 2 within the effective range of an angle of view. Each of said prisms is provided with an aperture 3 through which photographic images of an equinumeral to said apertures are printed respectively on the surface 4 of a film, so that a film of positive photographic images is obtained based on said negative film, said positive images are looked at inversely by the right and left eyes through the optical system which is the same as the one for taking the photograph. The observer will be able to see stereoscopic images which are substantially the same as natural scenery. In this embodiment an arrangement of identical photographic images is formed with apertures 3 set in array. This prevents the whole surface of a film being efficiently used.

The present invention also eliminates the foregoing disadvantages in stereoscopic photograph systems. It provides a newly improved stereoscopic photograph system having an attachment composed of a plurality of prisms which are provided with a plurality of apertures disposed within the effective range of an angle of view of one objective lens for taking stereoscopic photograph and images through each of said apertures being printed separately on the surface of a film. Each of said prisms provided on said attachment has a separate angle of inclination, thereby causing the difference in arrangement between the separately printed images and said apertures.

Figure 4:
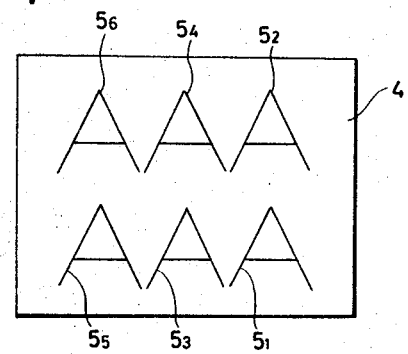
FIG. 4 is a plan view of stereoscopic pictures photographed on a film by using the stereo-attachment shown in FIG. 3.

FIG. 3 shows an embodiment, in the form of an attachment to be used for the system relating to the present invention. The attachment includes prisms $5_1$, $5_2$, as constituent elements thereof. Each one of said prisms has an angle of inclination which differs respectively in the direction of the secondary dimension such as to the right and left as well as upwards and downwards, thereby images printed on the surface 4 of a film through apertures $6_1$, $6_2$ formed with relation to an objective lens are subject to be re-arranged in array from an arrangement of said apertures as shown in FIG. 4. The aforementioned re-arrangement of photographic images, makes good use of the limited surface of a film.

Figure 5:
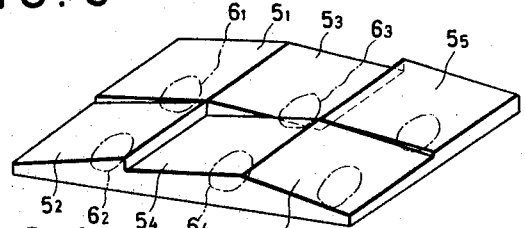
FIG. 5 is a perspective view of another stereo-attachment embodying the present invention.
Figure 6:
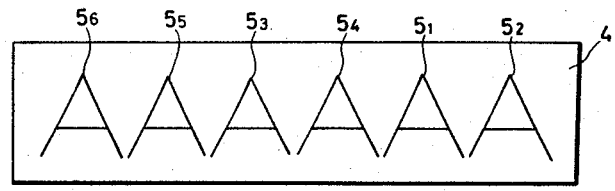
FIG. 6 is a plan view of an arrangement of photographic images printed on a film using the stereo-attachment shown in FIG. 5.

In FIG. 5 is shown an attachment to be applied for taking stereoscopic photograph on the surface of a film shaped in the form of an elongated band such as to be used for 8 mm. cine-film according to the present system. Here prisms $5_1$, $5_2$ serving as constituent elements of said attachment, are arrayed in two rows attached to each other. Each of said prisms is provided with an angle of inclination independently different to one another in the directions of the secondary dimension such as to the right and left as well as upwards and downwards. Photographic images passing through each of their corresponding apertures $6_1$, $6_2$, are subjected to be arranged in a row on the surface 4 of said film as shown in FIG. 6. The foregoing re-arrangement of photographic images, makes good use of the surface of an elongated band-shaped film as an elongated surface of picture. Moreover, using an attachment such as mentioned above, produces stereoscopic images in the directions to the right and left as well as upwards and downwards.

The above-described system of the present invention when applied to the stereoscopic photograph system in which an attachment for stereoscopic photograph is accommodated within a camera of conventional type, is of great advantage not only for obtaining substantially natural stereoscopic sensibility of images, but also for making the most of the limited surface of a film to be used.

What is claimed is:

1. A system for taking stereoscopic photographs, comprising a camera having an objective and a focal plane, a stereo attachment located in the image angle of said objective outside the camera, said stereo attachment having a single sheet formed into a plurality of prisms, said prisms each having surfaces with respective angles to cause light from a source to deviate in a different direction from its ordinary straight line path but remain within the image angle of said objective.

2. A system as in claim 1, wherein one surface of each of said prisms forms with the corresponding surfaces of the others of said prisms a single continuous flat face on one side of said sheet, said prisms forming a plurality of interrupted angular surfaces on the other side of said sheet.

3. A system as in claim 1, wherein said relative angles of said surfaces of the prisms cause the light from a source to deviate enough to prevent overlapping of images on the forcal plane.

4. A system as in claim 3, wherein one surface of each of said prisms forms with the corresponding surfaces of the others of said prisms a single continuous flat face on one side of said sheet, said prisms forming a plurality of interrupted angular surfaces on the other side of said sheet.

5. A system as in claim 1, wherein said objective forms an optical axis and said sheet is arranged transverse to the optical axis.

6. A system as in claim 5, wherein said prisms are positioned symmetrically about said optical axis.

7. A system as in claim 5, wherein one surface of each of said prisms forms with the corresponding surface of each of the others of said prisms a single continuous flat face on one side of said sheet, said prisms forming a plurality of interrupted surfaces on the other side of said sheet.

8. A system as in claim 5, wherein said relative angles of said surfaces of the prisms cause the light from a source to deviate enough to prevent overlapping of images on the focal plane.

9. A system as in claim 5, wherein one surface of each of said prisms forms with the corresponding surfaces of the others of said prisms a single continuous flat face on one side of said sheet, said prisms forming a plurality of interrupted angular surfaces on the other side of said sheet.

10. A system as in claim 1, wherein said prisms are arranged in a single row and deviate light only in one plane.

11. A system as in claim 1, wherein said prisms are arranged in a single row and different ones of said prisms deviate light in the plane formed by said row and said optical axis as well as transverse thereto so as to form images in rows and columns.

12. A system as in claim 1, wherein said prisms are arranged in rows and columns.

13. A system as in claim 1, wherein said prisms are arranged in rows and columns and different ones of said prisms deviate light in different transverse directions so as to align the images in only a single direction.

14. A system as in claim 2, wherein said prisms are arranged in a single row and deviate light only in one plane.

15. A system as in claim 2, wherein said prisms are arranged in a single row and different ones of said prisms deviate light in the plane formed by said row and said optical axis as well as transverse thereto so as to form images in rows and columns.

16. A system as in claim 2, wherein said prisms are arranged in rows and columns and different ones of said prisms deviate light in different transverse directions so as to align the images in only a single direction.

17. A system as in claim 1, wherein the number of prisms exceeds two.

18. A system as in claim 1, wherein each of said prisms includes a transparent aperture for passage of light therethrough.

19. A stereo device for a camera comprising a single sheet formed into a plurality of prisms, said prisms each having surfaces with respective angles to cause light travelling transverse to the sheet from a source to deviate in different directions from the ordinary straight line path.

20. A device as in claim 19, wherein said prisms are arranged in a single row and deviate light only in one plane.

21. A device as in claim 19, wherein said prisms are arranged in a single row and different ones of said prisms deviate light in the plane formed by said row and said optical axis as well as transverse thereto so as to form images in rows and columns.

22. A device as in claim 19, wherein said prisms are arranged in rows and columns.

23. A device as in claim 19, wherein said prisms are arranged in rows and columns and different ones of said prisms deviate light in different transverse directions so as to align the images in only a single direction.

References Cited

UNITED STATES PATENTS 3,113,484   12/1963   Baker _____ 350—130 X

JOHN K. CORBIN, Primary Examiner

P. A. Sacher, Assistant Examiner

U.S. Cl. X.R.

95—18 R, 18 P; 350—204, 286